US011887396B2

(12) United States Patent
Cholakkal et al.

(10) Patent No.: US 11,887,396 B2
(45) Date of Patent: Jan. 30, 2024

(54) METHOD FOR IDENTIFYING A HAND POSE IN A VEHICLE (71) Applicant: DAIMLER AG, Stuttgart (DE)

(72) Inventors: Hisharn Cholakkal, Kerala (IN); Sanath Narayan, Bangalore (IN); Arjun Jain, Bangalore (IN); Shuaib Ahmed, Bangalore (IN); Amit Bhatkal, Dandeli (IN); Mallikarjun Byrasandra Ramalinga Reddy, Bangalore (IN); Apurbaa Mallik, Bangalore (IN)

(73) Assignee: MERCEDES-BENZ GROUP AG, Stuttgart (DE)

( * ) Notice: Subject to any disclaimer, the term of this patent is extended or adjusted under 35 U.S.C. 154(b) by 264 days.

(21) Appl. No.: 17/273,521

(22) PCT Filed: Aug. 27, 2019

(86) PCT No.: PCT/EP2019/072747
§ 371 (c)(1),
(2) Date: Mar. 4, 2021

(87) PCT Pub. No.: WO2020/048814
PCT Pub. Date: Mar. 12, 2020

(65) Prior Publication Data
US 2021/0342579 A1 Nov. 4, 2021

(30) Foreign Application Priority Data
Sep. 5, 2018 (IN) .............................. 201841033282

(51) Int. Cl.
G06V 40/10 (2022.01)
G06T 7/73 (2017.01)
(Continued)

(52) U.S. Cl.
CPC ........ *G06V 40/113* (2022.01); *G06F 18/2413* (2023.01); *G06N 3/08* (2013.01);
(Continued)

(58) Field of Classification Search
CPC ............ G06N 3/08; G06T 2207/20084; G06T 2207/20132; G06T 2207/30268;
(Continued)

(56) References Cited

U.S. PATENT DOCUMENTS

2012/0250947 A1* 10/2012 Abramovich ...... G06V 40/1312
382/115
2014/0002444 A1* 1/2014 Bennett ................. G06T 19/006
345/419

(Continued)

FOREIGN PATENT DOCUMENTS

CN 1710593 * 12/2005 ............... G06K 9/00
CN 105404902 * 3/2016 ............. G06N 3/049

(Continued)

OTHER PUBLICATIONS

International Search Report and Written Opinion dated Dec. 11, 2019 in related/corresponding International Application No. PCT/EP2019/072747.

(Continued)

*Primary Examiner* — Zhiyu Lu
(74) *Attorney, Agent, or Firm* — PATENT PORTFOLIO BUILDERS PLLC (57) ABSTRACT A method for identifying a hand pose in a vehicle involves identifying a hand image for a hand in the vehicle by extraction from a vehicle image of the vehicle. A plurality of contextual images of the hand image is obtained based on the single point. Each of the plurality of contextual images are processed using one or more layers of a neural network to obtain a plurality of contextual features associated with (Continued)

the hand image. A hand pose associated with the hand is identified based on the plurality of contextual features using a classifier model.

12 Claims, 8 Drawing Sheets

(51) Int. Cl.
*G06N 3/08* (2023.01)
*G06T 3/40* (2006.01)
*G06V 40/20* (2022.01)
*G06V 20/59* (2022.01)
*G06F 18/2413* (2023.01)

(52) U.S. Cl.
CPC ................. *G06T 3/40* (2013.01); *G06T 7/74* (2017.01); *G06V 20/59* (2022.01); *G06V 40/107* (2022.01); *G06V 40/28* (2022.01); *G06T 2207/20084* (2013.01); *G06T 2207/20132* (2013.01); *G06T 2207/30268* (2013.01)

(58) Field of Classification Search
CPC .. G06T 3/40; G06T 7/74; G06V 20/59; G06V 40/107; G06V 40/113; G06V 40/28
See application file for complete search history.

(56) References Cited

U.S. PATENT DOCUMENTS

2014/0063062 A1* 3/2014 Fateh ..................... G09G 5/00
345/633
2019/0034714 A1* 1/2019 Barth ..................... G06T 7/194

FOREIGN PATENT DOCUMENTS

EP         3203412 A1      8/2017
KR   WO2017191909    * 11/2017   ............. G06V 10/40

OTHER PUBLICATIONS

John et al.; "Deep Learning-based Fast Hand Gesture Recognition using Representative Frames;" 2016 International Conference on Digital Image Computing: Techniques and Applications (DICTA); Nov. 30-Dec. 2, 2016; Gold Coast, QLD, AU.

Kopinski et al.; "Gesture-based Human-Machine Interaction For Assistance Systems;" Proceedings of the 2015 IEEE International Conference on Information and Automation; Aug. 2015; Lijiang, CN.

Molchanov et al.; "Online Detection and Classification of Dynamic Hand Gestures with Recurrent 3D Convolutional Neural Networks;" 2016 IEEE Conference on Computer Vision and Pattern Recognition; Jun. 27-30, 2016; Las Vegas, NV, US.

* cited by examiner

METHOD FOR IDENTIFYING A HAND POSE IN A VEHICLE

TECHNICAL FIELD

The present disclosure generally relates to automobiles. Particularly, but not exclusively, the present disclosure relates to method for identifying a hand pose for a hand in a vehicle. Further embodiments of the present disclosure disclose a system and method for performing an event in a vehicle based on an identified hand pose.

BACKGROUND

One or more techniques in image processing may be used in understanding gestures or hand poses in an image. Trained models, which may be classification models or classifier models, may be implemented for classifying the hand pose to a corresponding class. Hand pose identification techniques may be used in various real-time applications to perform various tasks or operations. It may be required that, when such techniques are implemented in a real-time application, performance and accuracy should not be compromised. Also, utilization of embedded platform with minimal power consumption and minimal heat generation may be necessary.

Some of the techniques disclose including pipelined structure with cascaded modules implementing a hand box technique. In such techniques, a portion of input image, defined by bounding boxes, is received and a feature vector for each image portion may be generated. The feature vectors are inputted to the classifier models to output a probability match with a predefined class associated with the input image. Such techniques may be computationally expensive and complete pipeline structure may depend on accuracy of the hand box detection. Hence, errors in the hand box detection may reduce performance of the pipeline structure. Also, there may be accumulation of error in the cascaded modules.

Other techniques for hand pose detection may involve detecting each finger and their orientation in the inputted image. The hand pose may be identified by comparing position and orientation of the fingers with predefined attributes. However, such techniques may require finding multiple finger joints, which may be computationally expensive. Also, since retrieval of information at multiple scales is missed and the techniques include mere comparison, accurate output may not be obtained.

The information disclosed in this background of the disclosure section is only for enhancement of understanding of the general background of the invention and should not be taken as an acknowledgement or any form of suggestion that this information forms the prior art already known to a person skilled in the art.

SUMMARY

In an embodiment, the present disclosure relates to a method for identifying a hand pose in a vehicle. Initially, for the identification, a hand image for a hand in the vehicle is extracted from a vehicle image of the vehicle. A plurality of contextual images of the hand image are obtained based on the single point. Further, each of the plurality of contextual images are processed using one or more layers of a neural network to obtain a plurality of contextual features associated with the hand image. A hand pose associated with the hand is identified based on the plurality of contextual features using a classifier model.

In an embodiment, the present disclosure relates to an event performing system and method thereof, for performing an event in vehicle based on identified hand pose. The event performing system comprises a processor and a memory communicatively coupled to the processor. The memory stores processor-executable instructions, which on execution cause the processor to perform the event. Initially, for the identification, a hand image for a hand in the vehicle is extracted from a vehicle image of the vehicle. A plurality of contextual images of the hand image are obtained based on the single point. Further, each of the plurality of contextual images are processed using one or more layers of a neural network to obtain a plurality of contextual features associated with the hand image. A hand pose associated with the hand is identified based on the plurality of contextual features using a classifier model.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and regarding the accompanying figures, in which.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the forms disclosed, but on the contrary, the disclosure is to cover all modifications, equivalents, and alternative falling within the spirit and the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

The terms "includes", "including", or any other variations thereof, are intended to cover a non-exclusive inclusion, such that a setup, device or method that includes a list of components or steps does not include only those components or steps but may include other components or steps not expressly listed or inherent to such setup or device or method. In other words, one or more elements in a system or apparatus proceeded by "includes . . . a" does not, without more constraints, preclude the existence of other elements or additional elements in the system or method.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

The present disclosure teaches a method for identifying a hand pose in a vehicle and a system for performing an event in the vehicle based on the identified hand pose. The present disclosure may be implemented in interior of the vehicle to achieve real-time performance on embedded platforms, with minimal power consumption and heat generation. A static image (also referred to as a single image or a vehicle image) of an interior of the vehicle is used to identify the hand pose and perform the event. A hand image associated with a hand in the vehicle image is extracted from the vehicle image, and multiple contextual images are retrieved for the hand image. The multiple contextual images are processed using a neural network for identifying the hand pose for the hand and performing an event based on the identified hand pose. By the proposed method and system, accurate identification of a hand pose for a hand may be achieved, for performing a corresponding event.

Figure 1:
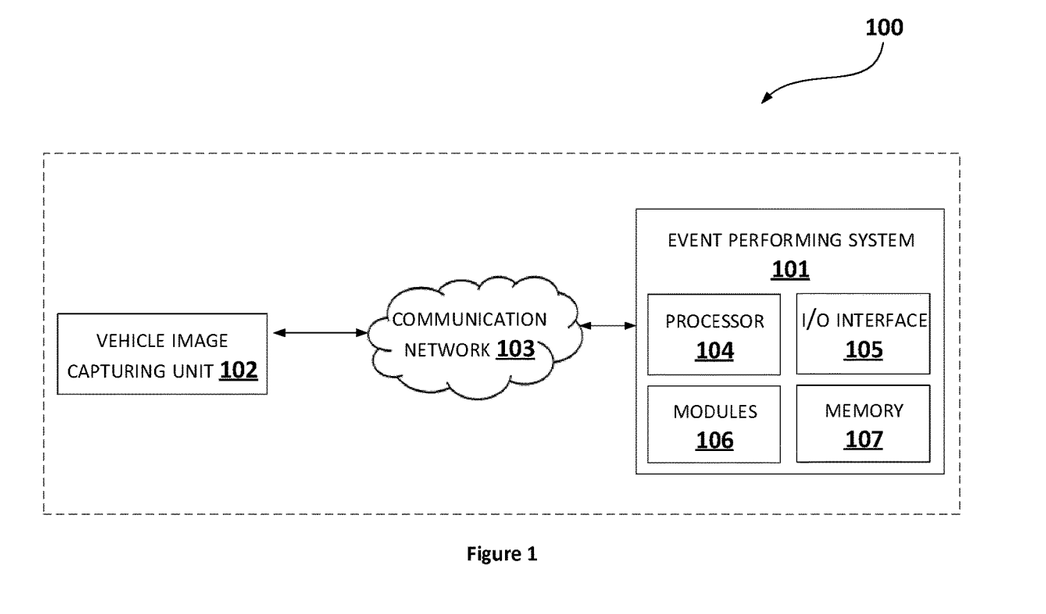
FIG. 1 shows exemplary vehicle environment for performing an event in a vehicle based on identified hand pose, in accordance with some embodiments of the present disclosure.

FIG. 1 shows an exemplary vehicle environment 100 for performing an event in a vehicle based on an identified hand pose, in accordance with some embodiments of the present disclosure. The vehicle environment 100 may be integral part of a vehicle. As shown in the figure, the vehicle environment 100 may include an event performing system 101, a vehicle image capturing unit 102, and a communication network 103. The event performing system 101 may be configured to perform an event in the vehicle 103, by performing steps as disclosed in the present disclosure. The event performing system 101 may be configured to identify a hand pose in a vehicle image that may be captured by a vehicle image capturing unit 102 in the vehicle for performing the event. In an embodiment, the vehicle may be a car, truck, van, or any other transportation means, which may be enabled to perform an event based on hand poses or hand gestures of hands of driver or passenger in the vehicle. The vehicle image capturing unit 102 may be configured to capture an image of interior of the vehicle to retrieve the vehicle image. In an embodiment, the vehicle image capturing unit 102 may be a camera, image capturing unit or any other device which may be configured to capture image of the interior of the vehicle.

The event performing system 101 may communicate with the vehicle image capturing unit 102 via the communication network 103 as shown in the FIG. 1. The communication network 103 may include, without limitation, a direct interconnection, Control Area Network (CAN), Local Area Network (LAN), Wide Area Network (WAN), wireless network (e.g., using Wireless Application Protocol), the Internet, and the like. In an embodiment, the vehicle image capturing unit 102 may be integral part of the event performing system 101.

The event performing system 101 may include a processor 104, I/O interface 105, one or more modules 106, and a memory 107. In some embodiments, the memory 107 may be communicatively coupled to the processor 104. The memory 107 stores processor executable instructions, which, on execution, may cause the event performing system 101 to perform the event in the vehicle based on a hand pose, as disclosed in the present disclosure. In an embodiment, each of the one or more modules 106 may be hardware modules, configured to perform the steps of the present disclosure. In an embodiment, each of the hardware modules may be a hardware unit that may be outside the memory 107 and coupled with the event performing system 101. In an embodiment, the one or more modules 106 may be integral part of the memory 107 (not shown in the figure). In a preferred embodiment of the present disclosure, the event performing system 101 may be implemented in a semiconductor device such as, Field Programmable Gate Array (FPGA), and the like.

Initially, for performing the event in the vehicle, hand poses of one of the driver or the passenger may be identified. In an embodiment, the event performing system 101 illustrated in FIG. 1, may be configured to identify a hand pose associated with a hand in the vehicle 103 and perform the event based on the identified hand pose. When a vehicle image of the interior of the vehicle is captured by the vehicle image capturing unit 102, one or more hands in the vehicle may be identified using the vehicle image. The one or more hands may belong to at least one of the driver and the passenger in the vehicle. Initially, using a single point associated with each of the one or more hands in the vehicle, a hand image for each of the one or more hands is extracted. The event performing system 101 may be configured to identify hand pose associated with each of the one or more hands, using the corresponding hand image. Steps disclosed in the present disclosure are performed on the hand image associated with every hand in the vehicle image to identify the corresponding hand pose. Thereby, a corresponding event based on the identified hand pose is performed. For identifying the hand pose associated with the hand image, the single point for every hand in the vehicle image, may be identified. The hand image extracted using the single point may be image with a predefined size, including the corresponding hand from the vehicle image. The hand image may be cropped from the vehicle image. The hand image extracted for each of the one or more hands may be of a same size. In an embodiment, the single point may be identified and the hand image may be extracted using neural network-based techniques, known in the art.

Upon extracting the hand image, plurality of contextual images of the hand image may be obtained based on the single point. In an embodiment, each of the plurality of contextual images may be obtained in corresponding predefined size. The predefined size may be achieved by selecting the single point at a fixed position in the hand image and cropping the vehicle image as per the predefined size. In cases where the hand image includes more than one hand of the vehicle image, by selecting the single point at a fixed position in the hand image, the plurality of contextual images associated with hand of interest, for which the hand pose is to be identified, may only be obtained. Thereby, the event performing system 101 may be configured to easily differentiate between the hand of interest and other hands in the hand image. By which, the hand pose of the hand of interest shall be identified accurately by the event performing system 101. In an embodiment, the fixed position can be the center point in the hand image. In other embodiments, the single point may be at one of top-left point, top-right point, bottom-left point and bottom-up point in the hand image. Maintaining the single point at the fixed-position in the hand image and thereby in the plurality of contextual images, helps the fully connected layers of the neural network to identify the hand pose associated with the hand of interest, irrespective of presence of other hands in the hand image. One or more other techniques, known to a person skilled in the art, may be implemented for obtaining the plurality of contextual images with corresponding predefined size, based on the single point. In an embodiment, the hand image may be pre-processed using one or more image channels and a neural network associated with the hand image. In an embodiment, the one or more image channels may include an amplitude image and a depth image of the hand image.

Further, each of the plurality of contextual images may be processed using one or more layers of a neural network, to obtain a plurality contextual features associated with the hand image. The plurality contextual features may be extracted features from the hand image. In an embodiment, the neural network may be a Convolution Neural Network (CNN) and the one or more layers may comprise at least one of a convolution unit, a batch normalization unit, a rectified linear unit, a fully connected unit and a pooling unit. In an embodiment, when processing the hand image, neural network features may be used for obtaining the plurality of contextual features. In an embodiment, the event performing system 101 may be configured to extract the neural network features using the neural networks used for extracting the hand image from the vehicle image. One or more other techniques, known to a person skilled in the art, may be implemented for extracting the neural network features of the hand image for processing the plurality of contextual images.

The hand pose associated with the hand may be identified based on the plurality of contextual features obtained for the hand image extracted for the hand. A classifier model may be used for identifying the hand pose. In an embodiment, the classifier model may be trained based on predefined hand poses and one or more attributes associated with the predefined hand poses, to identify the hand pose. In an embodiment, each of the plurality of contextual features may be aggregated for identifying the hand pose. In an embodiment, the aggregation may be performed by concatenating the plurality of contextual features. One or more other techniques, known to a person skilled in the art, may be implemented, for aggregating the plurality of contextual features.

Based on the identified hand pose, the event performing system 101 may be configured to perform the event in the vehicle. In an embodiment, upon identifying the hand pose, the event performing system 101 may be configured to execute a set of instructions to perform a task associated with the event in the vehicle.

In an embodiment, the event performing system 101 may receive data for performing event in the vehicle through the I/O interface 105 of the event performing system 101. The received data may include, but is not limited to, the vehicle image and so on. Also, the event performing system 101 may transmit data, for performing events in the vehicle, via the I/O interface 105. The transmitted data may include, but is not limited to, instructions and so on. In an embodiment, the I/O interface 105 may be coupled with the processor 104 of the event performing system 101.

Figure 2:
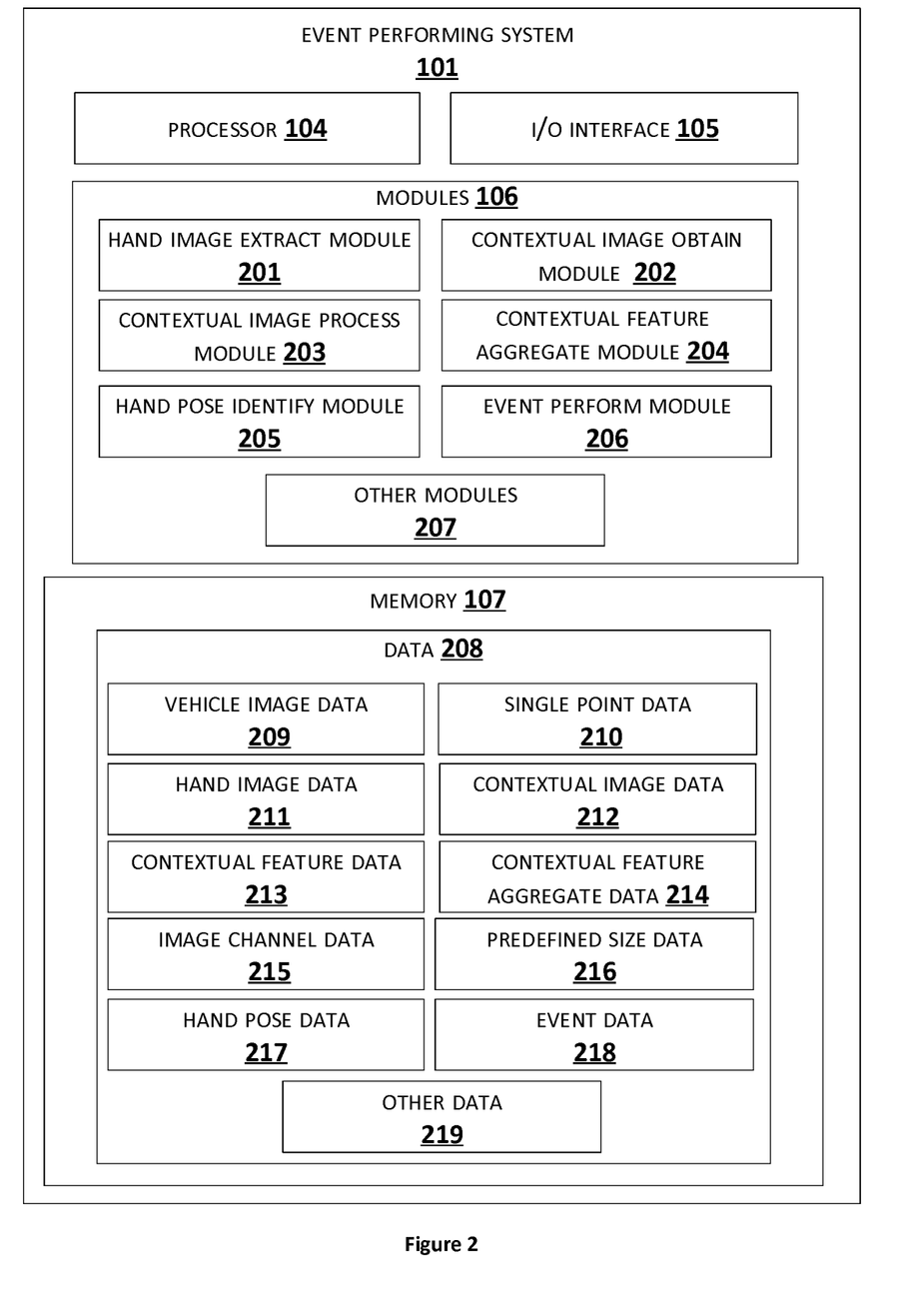
FIG. 2 shows a detailed block diagram of an event performing system for performing an event in a vehicle based on identified hand pose, in accordance with some embodiments of the present disclosure.

FIG. 2 shows a detailed block diagram of the event performing system 101 for performing the event in the vehicle 103 based on the identified hand pose.

Data 208 in the memory 107 and the one or more modules 106 of the event performing system 101 may be described herein in detail.

In one implementation, the one or more modules 106 may include, but are not limited to, a hand image extract module 201, a contextual image obtain module 202, a contextual image process module 203, a contextual feature aggregate module 204, a hand pose identify module 205, an event perform module 206 and one or more other modules 207, associated with the event performing system 101.

In an embodiment, the data 208 in the memory 107 may comprise vehicle image data 209 (also referred to as vehicle image 209), single point data 210 (also referred to as single point 210), hand image data 211 (also referred to as hand image 211), contextual image data 212 (also referred to as plurality of contextual images 212), contextual feature data 213 (also referred to as plurality of contextual features 213), contextual feature aggregate data 214 (also referred to as aggregated plurality of contextual features 214), image channel data (also referred to as one or more image channels 215), predefined size data 216 (also referred to as predefined size 216), hand pose data 217 (also referred to as hand pose 217), event data 218 (also referred to as event 218), and other data 219 associated with the event performing system 101.

In an embodiment, the data 208 in the memory 107 may be processed by the one or more modules 106 of the event performing system 101. In an embodiment, the one or more modules 106 may be implemented as dedicated units and when implemented in such a manner, the modules may be configured with the functionality defined in the present disclosure to result in a novel hardware. As used herein, the term module may refer to an Application Specific Integrated Circuit (ASIC), an electronic circuit, a Field-Programmable Gate Arrays (FPGA), Programmable System-on-Chip (PSoC), a combinational logic circuit, and/or other suitable components that provide the described functionality.

Figure 3A:
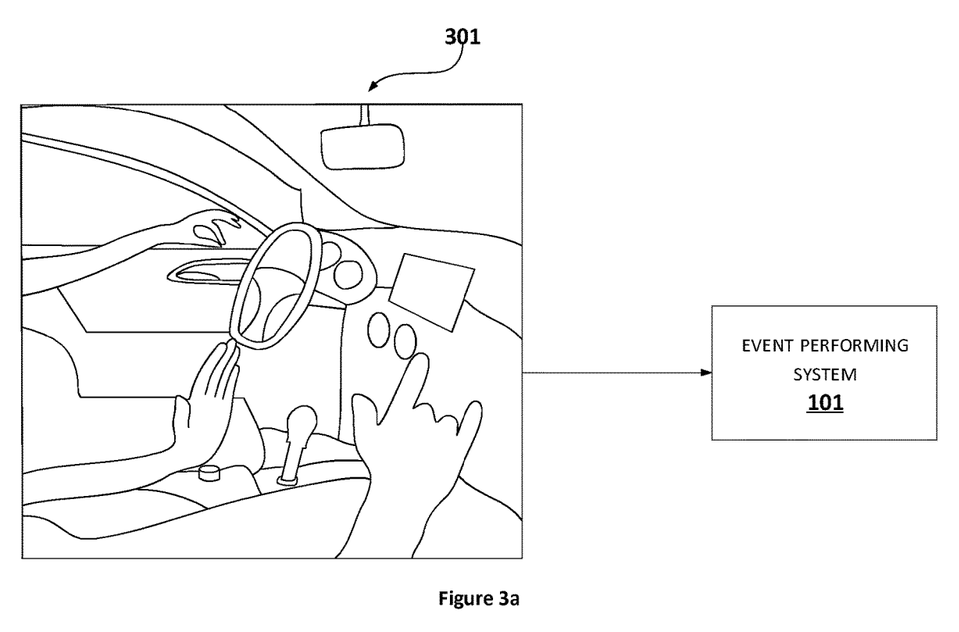
FIG. 3*a*-3*e* illustrates exemplary embodiments for performing an event in a vehicle based on identified hand pose, in accordance with some embodiments of present disclosure.
Figure 3B:
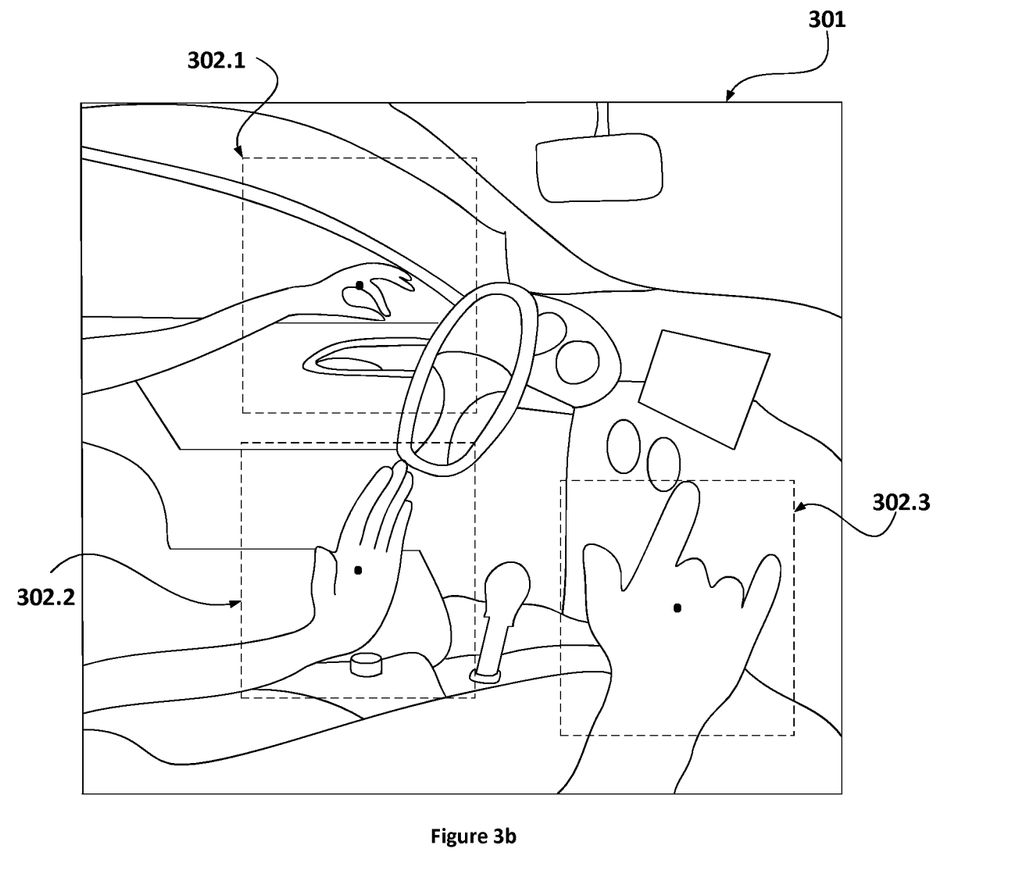

In the present disclosure, the vehicle image capturing unit 102 may be configured to capture the vehicle image 209 of an interior of the vehicle. An exemplary representation of the vehicle image 301 may be illustrated in FIG. 3a. In the scenario illustrated in FIG. 3a, the vehicle image 301 includes three hands. As shown in FIG. 3b, hand poses corresponding to the three hands is to be identified. Consider the three hands in FIG. 3b to be a first hand, a second hand, and a third hand. The hand image extract module 201 may be configured to extract the hand image 211 associated with each of the three hands from the vehicle image 301. In an embodiment, the hand image 211 of a hand may be a portion in the vehicle image 301, covering the corresponding hand. The size of the hand images extracted for the hands may be fixed and predetermined. Consider hand image 302.1 may be extracted for the first hand, hand image 302.2 may be extracted for the second hand, and hand image 302.3 may be extracted for the third hand, as shown in FIG. 3b. In the present disclosure, for extracting the hand images 302.1, 302.2 and 302.3, a single point 210 associated with each of the three hands may be identified and the hand images 302.1, 302.2 and 302.3 may be extracted based on the single point 210. In an embodiment, the single point 210 of each of the hands may indicate respective hand joint in the vehicle image 301. One or more techniques, known to a person skilled in the art, may be implemented for identifying the single point 210 of the three hands and extracting the hand images 302.1, 302.2 and 302.3. In an embodiment, neural network-based technique, known in the art, may be implemented for identifying the single point 210 and extracting the hand images 302.1, 302.2 and 302.3. The neural network-based techniques may be one of hand-joint detection technique, Histogram of Oriented Gradients (HOG)-logistic regression and the like.

Further steps indicated in the present disclosure may be performed for each of the hand images 302.1, 302.2 and 302.3, individually. The hand pose associated with each of three hands in the hand images 302.1, 302.2 and 302.3 may be identified stored as hand pose data 217 in the event performing system 101. The event 218 may be performed based on the identified hand pose for each of the three hands.

Figure 3C:
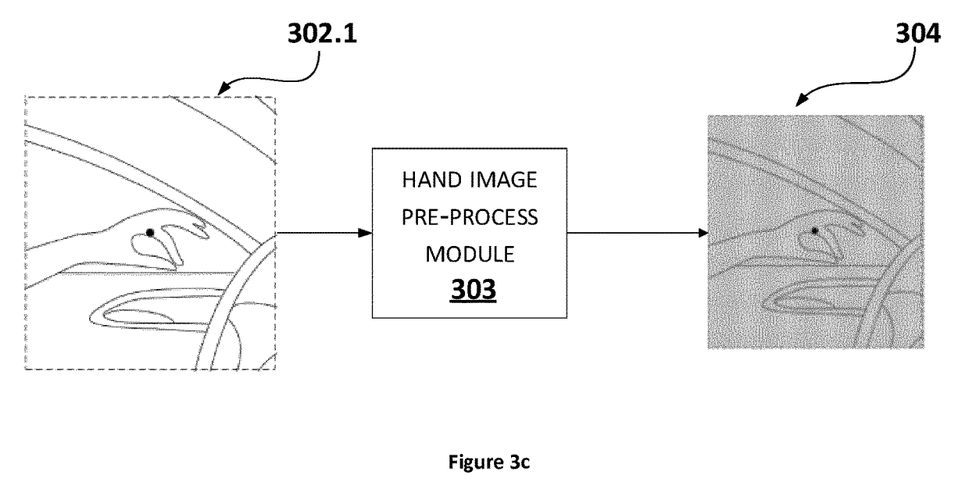

Consider, hand pose associated with the first hand in the vehicle image 301 is to be identified. The hand image 302.1 is extracted from the vehicle image 301. In an embodiment, the event performing system 101 may be associated with a hand image pre-process module 303, which is configured to pre-process the hand image 302.1 of the first hand, based on the one or more image channels 215, as illustrated in FIG. 3c. In an embodiment, the one or more image channels 215 may include, but are not limited to, an amplitude image and a depth image of the hand image 302.1 of the first hand. The amplitude image may represent amplitude features of the hand image 302.1 and the depth image may represent distance of each pixel in the hand image 302.1 from the vehicle image capturing unit 102. Further, one or more techniques, known in the art, may be implemented to determine, using the depth image, the distance of each pixel in the hand image 302.1 from the single point 210 in the hand image 302.1. In an embodiment, the depth image may be re-mapped using the distance between the pixel and the single point 210 and the re-mapped depth image may be provided as one of the one or more image channels 215. One or more other image channels, known in the art, may be used for pre-processing the hand image 302.1. Also, one or more techniques known to a person skilled in the art, may be implemented to retrieve the one or more image channels 215 of the hand image 302.1. In an embodiment, the hand image pre-process module 303 may be an integral part of the event performing system 101, as one of the other modules 207. In an embodiment, the hand image pre-process module 303 may be outside the event performing system 101 and pre-processed hand image 302.1 of the first hand may be provided to the contextual image obtain module 202 for obtaining the plurality of contextual images 212. In an embodiment, the hand image pre-process module 303 may include an image channel extract module and one or more layers of a neural network. The image channel extract module may be configured to extract the one or more image channels 215 of the hand image 302.1. The one or more layers of the neural network may be configured to pre-process the hand image 302.1 using the one or more image channels 215. In an embodiment, any neural network, known to a person skilled in the art may be implemented for the pre-processing. In a preferred embodiment, the neural network may be CNN. In an embodiment, the one or more image channels 215, including the amplitude image and the depth image, may be pre-processed using one or more layers of the CNN. In an embodiment, upon pre-processing, the amplitude image and the depth image may be combined to obtain the plurality of contextual images 212. An exemplary representation of the pre-processed hand image 304 is illustrated in FIG. 3c. In an embodiment, the processing of the hand image 302.1 may be performed to convert raw images to a feature extracted image which may be used to obtain the plurality of contextual images 212.

Figure 3D:
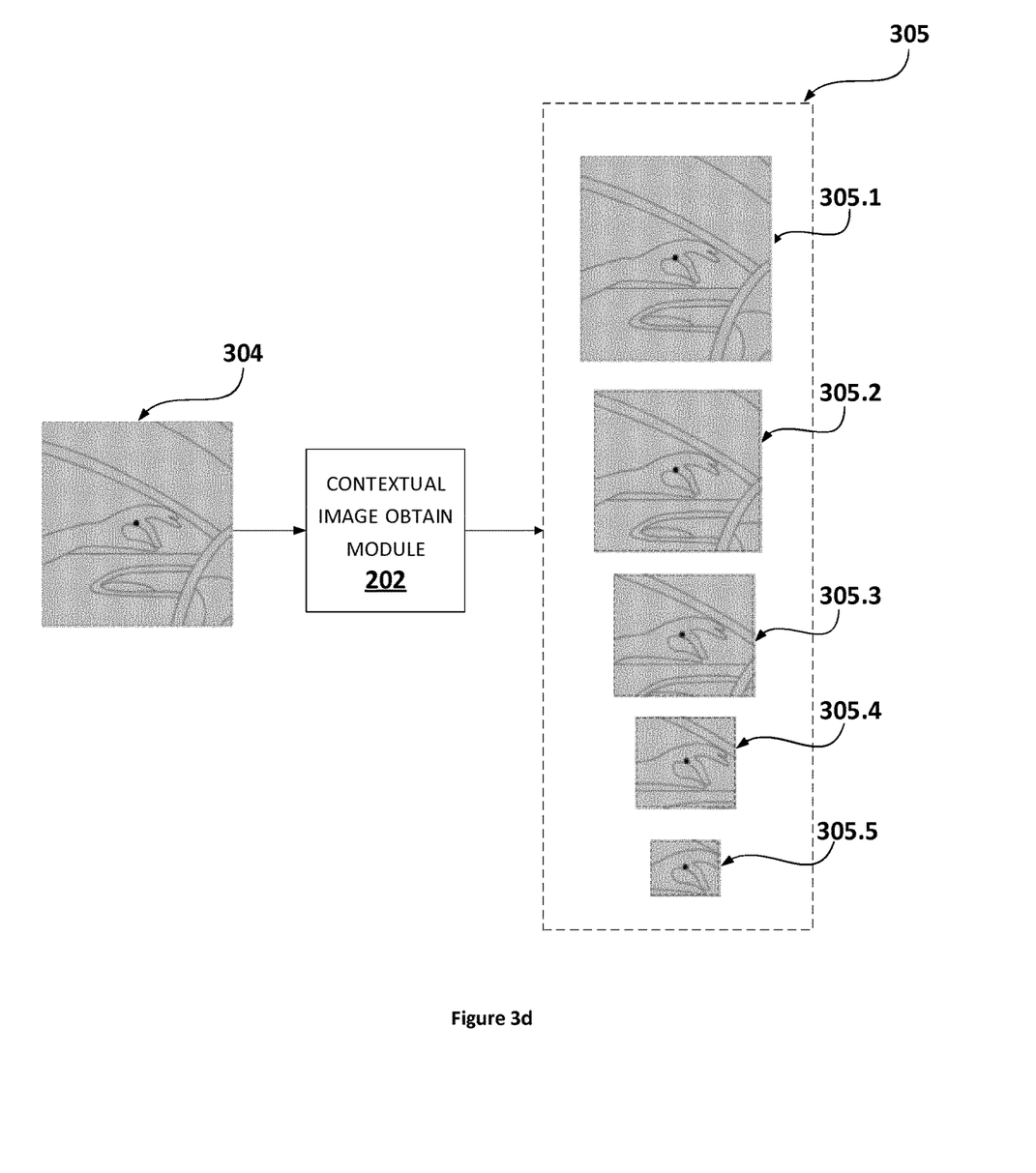

The contextual image obtain module 202 may be configured to obtain the plurality of contextual images 212 of the hand image 302.1. The plurality of contextual images 212 may be obtained based on the single point 210 as illustrated in FIG. 3d. In an embodiment, each of the plurality of contextual images 212 may be obtained based on corresponding predefined size 216. The predefined size 216 may be achieved by selecting the single point 210 as the center point in the hand image 302.1. Number of the plurality of contextual images 212 may be selected based on attributes provided by a user associated with the event performing system 101. In an exemplary embodiment, consider the plurality of contextual images 212 include a first contextual image 305.1, a second contextual image 305.2, a third contextual image 305.3, a fourth contextual image 305.4 and a fifth contextual image 305.5. In an embodiment, the contextual image obtain module 202 may be configured to crop the processed hand image 304 by keeping the single point 210 as the center point. The cropping may be performed based the corresponding predefined size 216 to obtain respective contextual image. In an embodiment, the predefined size 216 for each of the plurality of contextual images 212 may be provided by the user. In an embodiment, one or more techniques, known to a person skilled in the art, may be implemented for defining the predefined size 216 for each of the plurality of contextual images 212. In another embodiment, the contextual image obtain module 202 may be configured to define the dimension of the hand image 302.1 to obtain the plurality of contextual images 212 with respective predefined size 216. Any technique, known to a person skilled in the art, to obtain the plurality of contextual images 212, may be implemented in the present disclosure.

Figure 3E:
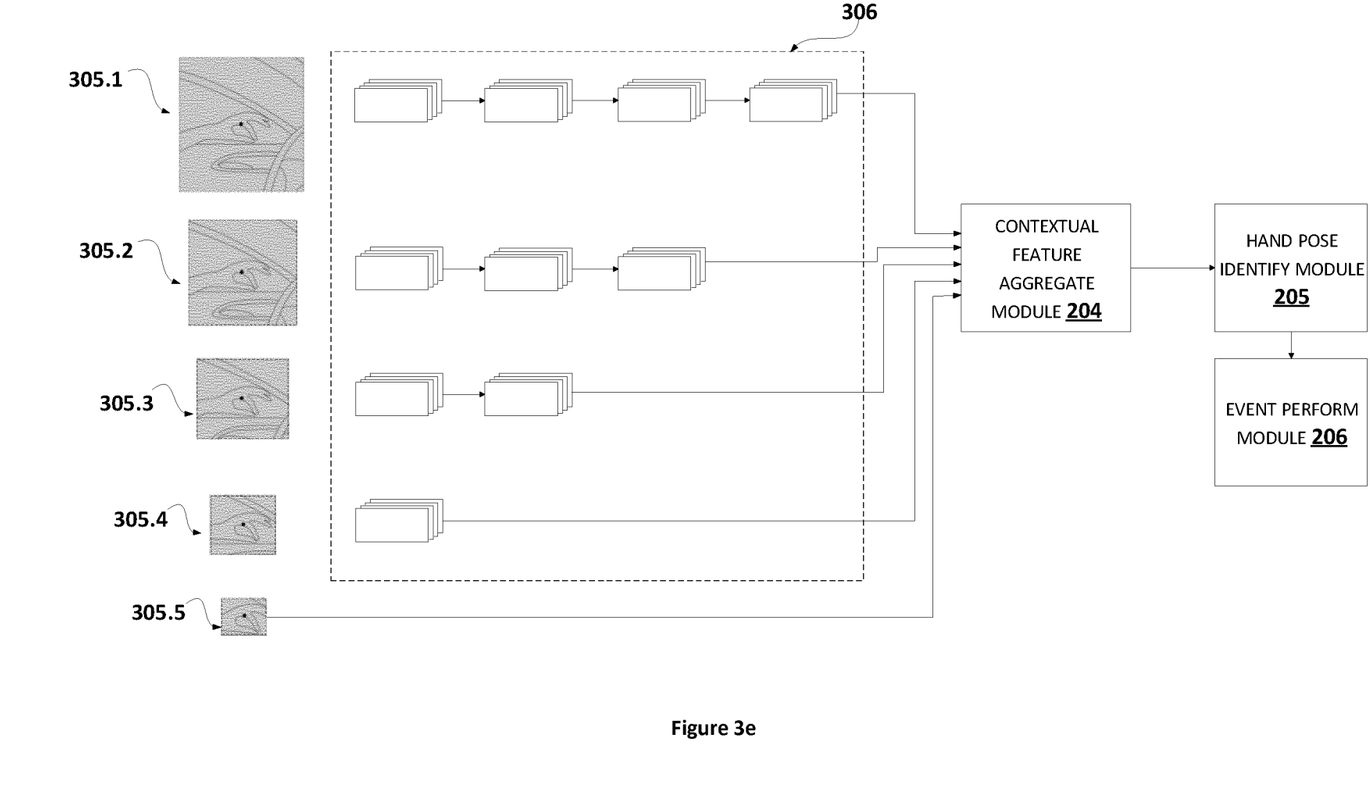

Upon obtaining the plurality of contextual images 212, the contextual image process module 203 may be configured to process each of the plurality of contextual images 212 to obtain the plurality of contextual features 213. The plurality of contextual images 212 may be processed using the one or more layers of a neural network 306 as shown in FIG. 3e. As illustrated in FIG. 3e, each of the plurality of contextual images 212 may be processed using a predefined number of layers in the neural network 306. The neural network 306 may be CNN. Each of the one or more layers may comprise at least one of the convolution unit, the batch normalization unit, the rectified linear unit, the pooling unit, and the fully connected unit. The first contextual image 305.1 may be processed using four layers of the neural network 306. The second contextual image 305.2 may be processed using three layers of the neural network 306. The third contextual image 305.3 may be processed using two layers of the neural network 306. The fourth contextual image 305.4 may be processed using a single layer of the neural network 306. The fifth contextual image 305.5 may not be processed using one or more layers of the neural network 306. In an embodiment, the number of one or more layers required for processing each of the plurality of contextual images 212 may vary based on the corresponding predefined size 216. In an embodiment, the processing of the plurality of contextual images 212 may be performed for analyzing the plurality of contextual images 212 at multiple scales and context sizes. By which, the plurality of contextual features 213 may be obtained.

Further, the contextual feature aggregate module 204 may be configured to aggregate the plurality of contextual features 213 for identifying the hand pose associated with the hand image 302.1. In an embodiment, the contextual feature aggregate module 204 may perform concatenation of each of the plurality of contextual features 213 for aggregating. Other techniques, known to a person skilled in the art, may be implemented for aggregating the plurality of contextual features 213. In an embodiment, the aggregated plurality of contextual features 214 may be stored in the event performing system 101 as the contextual feature aggregate data 214. The aggregated plurality of contextual features 214 may be provided to a fully connected layer followed by a SoftMax layer of the neural network 306. In an embodiment, the SoftMax layer may apply SoftMax function or normalized exponential function on the aggregated plurality of contextual images 214.

Further, the output of the contextual feature aggregate module 204 may be provided to the hand pose identify module 205, which may be configured to identify the hand pose 217. In an embodiment, the hand pose identify module 205 may include the classifier model, which may be trained to identify the hand pose 217 based on predefined hand poses and one or more attributes associated with the predefined hand poses. In an embodiment, identification of the hand pose associated with the first hand may also include identifying if the hand pose is associated with the driver or the passenger in the vehicle 103. In an embodiment, identification of the hand pose associated with the first hand may also include identifying if the hand pose is associated with left hand or right hand of one of the driver and the passenger in the vehicle. One or more techniques, known to a person skilled in the art may be implemented for said identification. Consider, for the hand image 302.1, the hand pose may be identified to be associated with the left hand of the driver of the vehicle and may be relating to closing of window on driver side of the vehicle. The identified hand pose may be communicated with the event perform module 206. Based on the identified hand pose, the event perform module 206 may be configured to perform the event 218 of closing the window on the driver side of the vehicle.

Steps illustrated in FIGS. 3c-3e may be performed on the other hand images 302.2 and 302.3 and the corresponding hand pose may be identified by the hand pose identify module 205. Further, the identified hand poses may be communicated with the event perform module 206 to perform corresponding events 218. In an embodiment, the event perform module 206 may be configured to prioritize the events 218 to be performed based on the identification. Consider, the hand in the hand image 302.2 may be identified to be associated with the hand pose of right hand of the passenger to switch on lights at passenger side. Similarly, consider, the hand in the hand image 302.3 may be identified to be associated with the hand pose of left hand of the passenger to adjust steering wheel position. Based on the identification, the event perform module 206 may perform the events 218 associated with the hand image 302.2 and the hand image 302.3 only. Since, the passenger is not authorized to adjust the steering wheel, the event 218 associated with the hand image 302.3 may be not performed. In an embodiment, the event perform module 206 may be configured to provide information regarding the event 218 to be performed to the driver and passengers of the vehicle. The information may be provided via one or more output means, known to a person skilled in the art. For the illustrated example, the information may also include a warning that the passenger is not authorized to adjust the steering wheel.

The other data 219 may store data, including temporary data and temporary files, generated by modules for performing the various functions of the event performing system 101. The one or more modules 106 may also include other modules to perform various miscellaneous functionalities of the event performing system 101. It will be appreciated that such modules may be represented as a single module or a combination of different modules.

Figure 4:
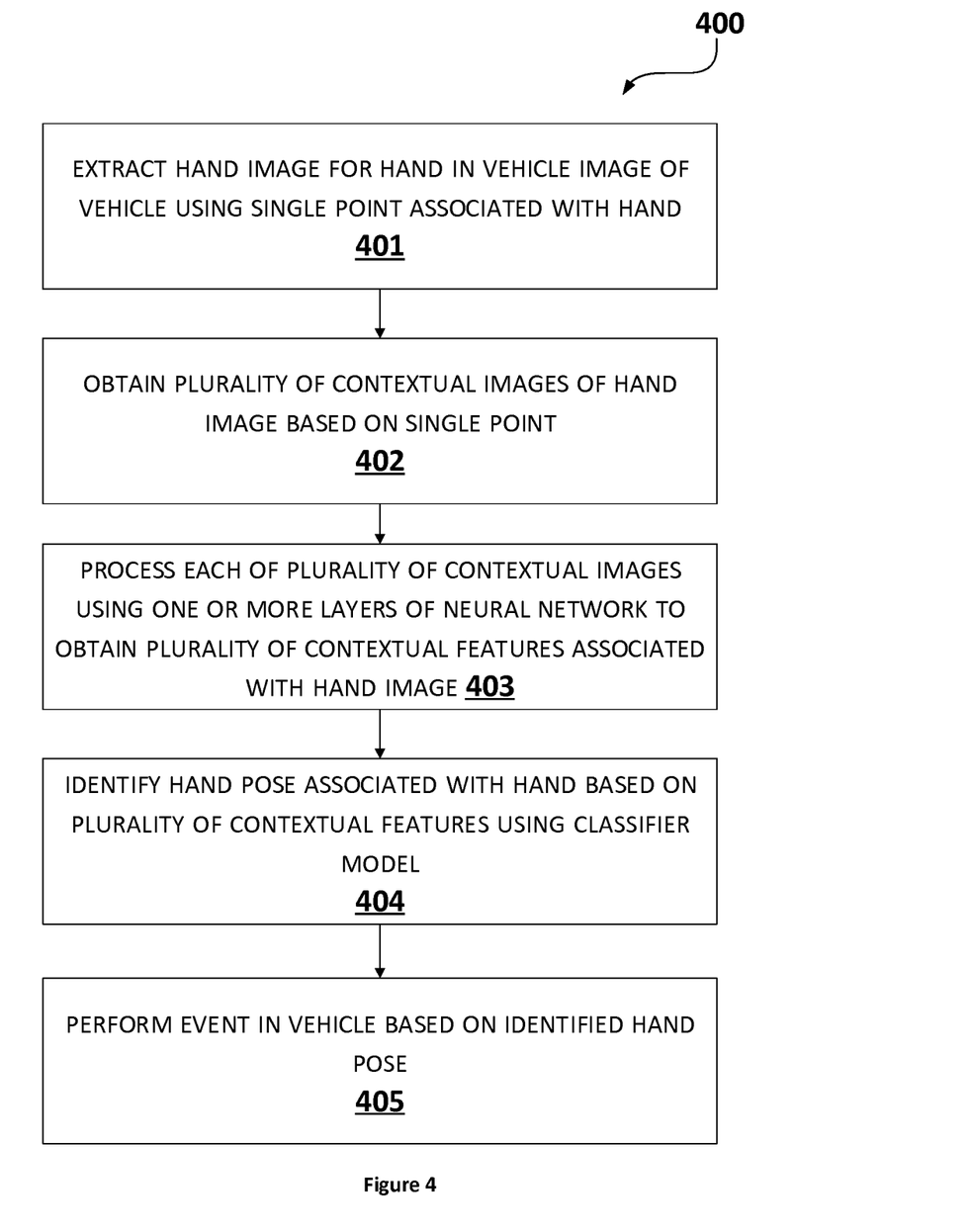
FIG. 4 illustrates a flowchart showing an exemplary method for performing an event in vehicle based on identified hand pose, in accordance with some embodiments of present disclosure.

FIG. 4 illustrates a flowchart showing an exemplary method for performing an event in a vehicle based on the identified hand pose, in accordance with some embodiments of present disclosure.

At block 401, the hand image extract module 201 may be configured to extract the hand image 211 of the hand from the vehicle image 209 captured in the vehicle. The extraction may be based on the single point 210 and a neural network-based technique.

At block 402, the contextual image obtain module 202 may be configured to obtain the plurality of contextual images 212 of the hand image 211 based on the single point 210. In an embodiment, each of the plurality of contextual images 212 may be associated with the corresponding predefined size 216.

At block 403, the contextual image process module 203 may be configured to process each of the plurality of contextual images 212 using the one or more layers of the neural network 306. By the processing, the plurality of contextual features 213 may be obtained for the hand image 211. In an embodiment, the neural network 306 may be the CNN and the one or more layers may comprise at least one of the convolution unit, the batch normalization unit, the rectified linear unit, the fully connected unit and the pooling unit.

At block 404, the hand pose identify module 205 may be configured to identify the hand pose 217 based on the plurality of contextual features 213. In an embodiment, the plurality of contextual features 213 may be provided to the classifier model for identifying the hand pose 217. The classifier model may be trained using predefined hand poses for the identification. In an embodiment, the classifier model may be one of a neural network 306, Support Vector Machine (SVM) and one or more layers of CNN. The one or more layers of the CNN may comprise at least one of the convolution unit, the batch normalization unit, the rectified linear unit, the fully connected unit and the pooling unit.

At block 405, the event perform module 206 may be configured to perform the event 218 based on the identified hand pose 217. In an embodiment, the event 218 may be one or more operations associated with the vehicle.

As illustrated in FIG. 4, the method 400 may include one or more blocks for executing processes in the event performing system 101. The method 400 may be described in the general context of computer executable instructions. Generally, computer executable instructions can include routines, programs, objects, components, data structures, procedures, modules, and functions, which perform particular functions or implement particular abstract data types.

The order in which the method 400 is described may not intended to be construed as a limitation, and any number of the described method blocks can be combined in any order to implement the method. Additionally, individual blocks may be deleted from the methods without departing from the scope of the subject matter described herein. Furthermore, the method can be implemented in any suitable hardware, software, firmware, or combination thereof.

Advantages

An embodiment of the present disclosure extracts fixed size hand image based on single point identified for a hand in a vehicle image, instead of variable size bounding boxes around the hand, by which, computation may be reduced. This also helps in parallelized implementation on hardware platform such as FPGA.

An embodiment of the present disclosure identifies a hand pose based on multiple contextual images received using a single box image of the hand from the vehicle image. By which, less complexity and a hardware friendly implementation, when compared to conventional systems, may be achieved.

An embodiment of the present disclosure provides accurate identification of hand poses in an image with multiple hands. This may be achieved by maintaining single point at a fixed position such as the center point to obtain plurality of contextual images associates with hand of interest only.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

A description of an embodiment with several components in communication with each other does not imply that all such components are required. On the contrary a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated operations of FIG. 4 shows certain events occurring in a certain order. In alternative embodiments, certain operations may be performed in a different order, modified, or removed. Moreover, steps may be added to the above described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

| Referral numerals: | |
|---|---|
| Reference Number | Description |
| 100 | Vehicle Environment |
| 101 | Event performing system |
| 102 | Vehicle image capturing unit |
| 103 | Communication network |
| 104 | Processor |
| 105 | I/O interface |
| 106 | Modules |
| 107 | Memory |
| 201 | Hand image extract module |
| 202 | Contextual image obtain module |
| 203 | Contextual image process module |
| 204 | Contextual feature aggregate module |
| 205 | Hand pose identify module |
| 206 | Event perform module |
| 207 | Other modules |
| 208 | Data |
| 209 | Vehicle image data |
| 210 | Single point data |
| 211 | Hand image data |
| 212 | Contextual image data |
| 213 | Contextual feature data |
| 214 | Contextual feature aggregate data |
| 215 | Image channel data |
| 216 | Predefined size data |
| 217 | Hand pose data |
| 218 | Event data |
| 219 | Other data |
| 301 | Vehicle image |
| 302.1, 302.2 and 303.3 | Hand images |
| 303 | Hand image pre-process module |
| 304 | Processed hand image |
| 305.1 . . . 305.5 | Contextual images |
| 306 | Neural network |

We claim:

1. A computerized method, comprising:
extracting a hand image of a hand in a vehicle image of a vehicle using a single point associated with the hand, wherein a size of the extracted hand image is fixed and predetermined, and wherein the single point is at a fixed position within the extracted hand image of a fixed and predetermined size;

obtaining a plurality of contextual images of the hand image based on the single point, wherein each of the plurality of contextual images is obtained by
selecting the single point at the fixed position in the hand image; and
cropping the hand image to a corresponding predefined size based on the single point as a center point;

processing each of the plurality of contextual images using a predefined number of layers of a neural network to obtain a plurality of contextual features associated with the hand image; and identifying, using a classifier model, a hand pose associated with the hand based on the plurality of contextual features.

2. The computerized method of claim 1, wherein the identification of the hand pose further comprises:
aggregating each of the plurality of contextual features.

3. The computerized method of claim 1, wherein the neural network is a convolution neural network having one or more layers comprising at least one of a convolution unit, a batch normalization unit, a rectified linear unit, a fully connected unit, and a pooling unit.

4. The computerized method of claim 1, wherein the plurality of contextual images are obtained by:
pre-processing the hand image using one or more image channels associated with the hand image and a neural network.

5. A computerized method, comprising:
extracting a hand image of a hand in a vehicle image of a vehicle using a single point associated with the hand, wherein a size of the extracted hand image is fixed and predetermined, and wherein the single point is at a fixed position within the extracted hand image of a fixed and predetermined size;
obtaining a plurality of contextual images of the hand image based on the single point, wherein each of the plurality of contextual images is obtained by
selecting the single point at the fixed position in the hand image; and
cropping the hand image to a corresponding predefined size based on the single point as a center point;
processing each of the plurality of contextual images using a predefined number of layers of a neural network to obtain a plurality of contextual features associated with the hand image;
identifying, using a classifier model, a hand pose associated with the hand based on the plurality of contextual features; and
performing, by an event performing system, an event corresponding to the identified hand pose.

6. A system, comprising:
a processor; and
a non-transitory memory communicatively coupled to the processor, wherein the memory stores processor-executable instructions, which, on execution, cause the processor to:
extract a hand image of a hand in a vehicle image of a vehicle using a single point associated with the hand, wherein a size of the extracted hand image is fixed and predetermined, and wherein the single point is at a fixed position within the extracted hand image of a fixed and predetermined size;
obtain a plurality of contextual images of the hand image based on the single point, wherein each of the plurality of contextual images is obtained by
selecting the single point at the fixed position in the hand image; and
cropping the hand image to a corresponding predefined size based on the single point as a center point;
process each of the plurality of contextual images using a predefined number of layers of a neural network to obtain a plurality of contextual features associated with the hand image; and
identify, using a classifier model, a hand pose associated with the hand based on the plurality of contextual features.

7. The computerized method of claim 1, wherein each of the plurality of contextual images are processed using a different number of the layers of the neural network.

8. The computerized method of claim 1, wherein the predefined number of layers used to process each of the plurality of contextual images is based on the corresponding predefined size of one of a contextual image of the plurality of contextual images being processed.

9. The computerized method of claim 5, wherein each of the plurality of contextual images are processed using a different number of the layers of the neural network.

10. The computerized method of claim 5, wherein the predefined number of layers used to process each of the plurality of contextual images is based on the corresponding predefined size of one of a contextual image of the plurality of contextual images being processed.

11. The system of claim 6, wherein the processor-executed instructions further cause the processor to process each of the plurality of contextual images using a different number of the layers of the neural network.

12. The system of claim 6, wherein the predefined number of layers used to process each of the plurality of contextual images is based on the corresponding predefined size of one of a contextual image of the plurality of contextual images being processed.

* * * * *